United States Patent Office 3,592,739
Patented July 13, 1971

3,592,739
PURIFICATION OF LACTASE
Moshe Sternberg, South Bend, Ind., assignor to Miles Laboratories, Inc., Elkhart, Ind.
No Drawing. Filed Dec. 19, 1968, Ser. No. 785,361
Int. Cl. C07g 7/02
U.S. Cl. 195—66     10 Claims

ABSTRACT OF THE DISCLOSURE

Lactase can be isolated and separated from impurities by mixing a lactase-containing solution with a heteropoly acid to form a precipitate with the lactase. The resulting precipitate is then separated from the remaining solution. Useful heteropoly acids are phosphotungstic acid, arsenotungstic acid, silicotungstic acid, borotungstic acid, phosphomolybdic acid, arsenomolybdic acid, silicomolybdic acid, boromolybdic acid, phosphovanadic acid, arsenovanadic acid, silicovanadic acid, borovanadic acid and mixtures and combinations thereof.

BACKGROUND AND PRIOR ART

Lactase or beta-galactosidase is an enzyme which is known to be capable of catalyzing the hydrolysis of lactose to form glucose and galactose. This enzyme activity is especially useful in the processing of milk products. When it is desired to concentrate milk to a high solids content, the lactose in the milk tends to crystallize and prevent such concentration. In this case lactase is added to the milk to convert the lactose to other sugars which will not solidify in the subsequently concentrated milk. It is often desired to increase the solids content of ice cream, for example, by adding whey to the ice cream mixture. The lactose content of the whey will crystallize upon freezing of the ice cream mixture and produce an undesirable product. In this case lactase is added to the whey prior to its inclusion in the ice cream mixture so that a desirable product is obtained.

Lactase is known to be produced by the growth of various organisms on suitable nutrient media. Illustrative useful organisms are *Saccharomyces fragilis, Bacillus megaterium, Neurospora crassa, Streptococcus lactis,* and *Aspergillus oryzae*. The organism most frequently used in the prior art was *Saccharomyces fragilis*. When *S. fragilis* is employed, the lactase enzyme is formed within the *S. fragilis* yeast cells. These cells are harvested by filtration or centrifugation from the growth medium and are then generally dried by various known techniques. The resulting dried powder is then used to impart lactase activity to the milk products. Since the whole dried growth cells are used, the contained lactase is thus contaminated with other cell constituents. The prior art discusses various ways of overcoming this contamination. Lactase activators, such as compounds containing an active sulfur atom, are added to improve the lactase action. Another known prior art technique is to extract the lactase from the growth cells with a mixture of potassium hydrogen phosphate and potassium dihydrogen phosphate, add acetone to the extractant to precipitate the lactase, dissolve the precipitate in water, add sucrose and spray dry to form a lactase-sucrose powder product. While the prior are describes the lactase products obtained from such isolation and purification techniques as being stable, having a good color, and producing satisfactory flavor in milk products, the commercially available *S. fragilis* lactase, for example, produces undersirable taste and smell in treated milk products and is generally unstable.

DESCRIPTION OF THE INVENTION

In accordance with the present invention, a process is provided for isolating and purifying a lactase which comprises mixing a lactase solution containing impurities with a heteropoly acid selected from the class consisting of phosphotungstic acid, arsenotungstic acid, silicontungstic acid, borotungstic acid, phosphomolybdic acid, arsenomolybdic acid, silicomolybdic acid, boromolybdic acid, phosphovanadic acid, arsenovanadic acid, silicovanadic acid, borovanadic acid and mixtures and combinations therof to form a precipitate between the lactase and the heteropoly acid, and then separating the resulting precipitate from the remaining impurity-containing solution. The so-purified precipitate can then be conveniently dried or it can be dissolved for further use if desired. This process has the advantage of isolating a purified form of lactase while still retaining an appreciable amount of the lactase enzyme activity. If the lactase is to be used in human food applications, the residual heteropoly acid in the precipitate complex can be removed.

The process of the present invention is useful for purifying lactase in various forms. It can be in the form of aqueous whole cultures and fermentation beers known in the art. It can also be in the form of impure dried material which is then dissolved in aqueous media for use in the present process. The concentration of lactase in the aqueous solution is not critical. As is known in the art, dilute solutions will require large quantities of liquid material to be processed in order to purify a given quantity of lactase. The more concentrated solutions will enable a given quantity of lactase to be purified with less effort and in a shorter period of time.

The heteropoly acids useful in this invention are phosphotungstic acid, arsenotungstic acid, silicotungstic acid, borotungstic acid, phosphomolybdic acid, arsenomolybdic acid, silicomolybdic acid, boromolybdic acid, phosphovanadic acid, arsenovanadic acid, silicovanadic acid, borovanadic acid, mixtures of two or more of these acids, and combinations of two or more of these acids, such as silicotungsticvanadic acid, phosphomolybdictungstic acid, arsenoboromolybdictungsticvanadic acid and the like. These heteropoly acids are well-known materials and are prepared by well-known methods. These heteropoly acids are all soluble in water.

In the practice of this invention an aqueous solution of lactase is mixed with the heteropoly acid or a solution of the heteropoly acid. The heteropoly acid is employed in an amount such that the resulting mixture contains from about 0.1 to about 1 percent (weight/volume basis) heteropoly acid. It is preferred to use the heteropoly acid in an amount such that the resulting mixture contains about 0.5 percent (weight/volume basis) heteropoly acid. The pH of the lactase solution should be in the range of from about 2.5 to about 6.6 when it is mixed with the heteropoly acid. The pH is preferably from about 3.0 to about 4.0. When the pH is below about 2.5, the lactase will lose substantially all its enzyme activity. When the lactase is obtained from *Aspergillus foetidus* or *Aspergillus awamori* and the pH is above about 4.5, no precipitate will form with the heteropoly acid. When the lactase is obtained from other organisms, no precipitate will form with the heteropoly acid at a pH above about 6.6. The mixing temperature and the mixing time between the heteropoly acid and the lactase-containing solution are not narrowly critical. A mixing temperature of from about 15° C. to about 45° C. and a mixing time of about 15 minutes are suitable.

The above-prepared precipitate can be separated by filtration, centrifugation or other convenient means from the remaining impurity-containing solution. The resulting solid material can be dried by convenient means and used in the dry form for its lactase activity. If the lactase is to be employed in treatment of human or animal foods, it is desirable to remove all traces of free heteropoly acids. When the lactase is obtained from *A. foetidus* or *A. awamori*, the lactase-heteropoly acid precipitate complex is dissolved by mixing it with an aqueous medium having a pH between about 5 and about 9, preferably between about 6 and about 8.5. When the lactase is obtained from other organisms, the complex is dissolved at a pH above about 6.6. To the resulting solution is then added a water-soluble calcium salt, such as calcium acetate, calcium chloride, calcium gluconate and the like, or water-soluble barium salts, such as barium acetate, barium chloride and the like. These added materials can form a solid complex at pH values above about 6.0 with the heteropoly acids or with the individual acid components of the heteropoly acids, and the resulting complex can be separated from the purified lactase solution. Any heteropoly acids remaining after this treatment can be conveniently removed from the solution by dialysis or ion exchange techniques, for example. The resulting highly purified lactase solution can be used "as-is" or it can be dried by convenient means, such as freeze-drying techniques, for further use.

It has been found that an exceptionally desirable stable lactase can be obtained by use of the present invention with lactase-containing materials prepared by growing *Aspergillus foetidus* ATCC 14916 or mutants thereof or *Aspergillus awamori* NRRL 3112 on a suitable aqueous nutrient medium containing well-known carbohydrates and inorganic salts.

The process of the present invention isolates and purifies lactase while retaining a significant amount of enzyme activity. The following method was employed to assay for lactase activity in the starting material and in the isolated purified product.

A buffered lactose solution was prepared by dissolving 11.1 g. lactose in 75–80 ml. hot distilled water, cooling to room temperature and adding 5 ml. of a 2 molar aqueous acetate buffer at pH 4.0, and then diluting the mixture to 100 ml. The 2 molar aqueous acetate buffer was previously prepared by adding 115 ml. glacial acetic acid to about 600 ml. distilled water and then adjusting to pH 4.0 with concentrated sodium hydroxide. The resulting solution was then diluted to 1.0 liter with distilled water. A 9.0 ml. portion of the above buffered lactose solution was pipetted into each of two 25 mm. x 150 mm. test tubes and heated to 60° C. in a water bath. A 1.0 ml. portion of an appropriately diluted lactase solution being assayed was then blown into one of the test tubes and swirled to mix. A 1.0 ml. portion of distilled water was placed in the other test tube to form a substrate blank. After exactly 15 min. a 1.0 ml. portion of 1.0 N hydrochloric acid was added to each test tube, swirled to mix and cooled to room temperature. The lactase solution being assayed was originally diluted so as to contain 0.2–0.5 lactase units/ml. or to have an absorbance of 0.1–0.4 as measured with a wavelength of 525 millimicrons.

A diluted sodium hydroxide solution was prepared by dissolving 80 g. sodium hydroxide in distilled water and diluting to about 1100 ml. A mixture of a 4.5 ml. portion of 2 molar acetate buffer at pH 4.0, about 100 ml. distilled water and 10 ml. 1.0 N hydrochloric acid was prepared. This mixture was titrated to pH 5.5, as measured with a pH meter, with the sodium hydroxide solution. The resulting titer multiplied by 100 was the volume of sodium hydroxide to be diluted to 1.0 liter. A 1.0 ml. portion of the above-prepared diluted sodium hydroxide solution was then added to the above acidified test tube contents. The resulting solution was the enzyme hydrolysis assay product.

A glucose oxidase reagent was prepared by filling a 100 ml. volumetric flask about two-thirds with 0.1 molar acetate buffer at pH 5.5. This acetate buffer was prepared by adjusting 50 ml. of the above-described 2 molar acetate buffer at pH 4.0 to pH 5.5 with sodium hydroxide and diluting to 1.0 liter with distilled water. A 1.0 ml. portion of 1 percent (weight/volume basis) aqueous o-dianisidine hydrochloride solution was then added to the volumetric flask containing the acetate buffer. A 0.1 ml. portion of a peroxidase-glucose oxidase solution was then added to the flask. The flask was then diluted to volume with 0.1 molar acetate buffer at pH 5.5 and stored in ice. The above peroxidase-glucose oxidase solution was prepared by dissolving 500 mg. horseradish peroxidase in 5 ml. of purified liquefied glucose oxidase solution containing about 1000 glucose oxidase units per ml.

A 4.0 ml. portion of the above glucose oxidase reagent was then placed into each of three 25 mm. x 150 mm. test tubes and heated to 30° C. in a water bath. A 2 ml. portion of distilled water was then added to one test tube to form a reagent blank. A 2 ml. portion of standard glucose solution was then added to another test tube to form a glucose standard. The standard glucose solution was prepared by diluting 10 ml. of a 1 percent (weight/volume basis) aqueous glucose solution to 1.0 liter with distilled water.

When the glucose oxidase reagent test tubes were at the proper temperature, the above enzyme hydrolysis assay product was added to the third test tube containing glucose oxidase reagent. The resulting mixture was then poured into a clean test tube and then back into the original glucose oxidase reagent test tube. This gave a reproducible standard amount of mixing. At exactly 5 min. after adding the assay product to the glucose oxidase reagent, 8.0 ml. of 10 N sulfuric acid were added thereto and swirled to mix. The absorbance or optical density at a light source wavelength of 525 millimicrons was then measured for the resulting assay product as compared to the reagent blank. The absorbance or optical density was also measured at the same wavelength against distilled water for the substrate blank and the glucose standard. The activity of the lactase sample was then calculated by the following equation wherein a lactose activity unit is the amount of enzyme that will form 1 micromole of glucose from lactose in 15 min. under the given assay conditions:

$$\text{Activity (units/ml.)} = \frac{0.444 \times \text{O.D. corr.}}{\text{O.D. std.} \times \text{dilution}}$$

wherein:

O.D corr.=O.D. sample–O.D. substrate blank.
O.D std.=O.D. of glucose standard.
Dilution=volume dilution of enzyme assay sample.

The invention will be further described in the following illustrative examples.

Example 1

An aqueous lactase solution was obtained by fermenting in a well-known manner an aqueous nutrient medium with a culture of a mutant of *Aspergillus foetidus* ATCC 14916 and then filtering off the mycelium. This mutant of *Aspergillus foetidus* ATCC 14916 was prepared by well-known ultra-violet irradiation techniques. The resulting filtrate was then concentrated by evaporation to a solids level of 12.65 percent (weight/volume basis). A 160 ml. portion of the concentrated filtrate having an activity of 51.6 units/ml. was adjusted to pH 3.2 with diluted hydrochloric acid and divided into four 40 ml. portions. To three of the above portions were separately and individually added 0.5 percent (weight/volume basis) phosphotungstic acid, borotungstic acid and silicotungstic acid, respectively. To the fourth portion was added 0.75 percent (weight/volume basis) phosphomolybdic acid. The reaction mixtures were then allowed to stand for 15 min. at 37° C. during which time precipitates formed in each portion. The precipitates were separately recovered by centrifugation and then separately dissolved in 2 percent (weight/volume basis) aqueous calcium acetate solution. The calcium acetate provided a suitable pH condition to dissolve the lactose-heteropoly acid precipitates and also formed new precipitates with the free heteropoly acids which were removed from the purified lactase solutions. The resulting solutions were assayed for lactase activity as shown below:

| Heteropoly acid employed | Lactase product activity, units/ml. | Lactase activity recovery, percent |
|---|---|---|
| Phosphotungstic | 29.0 | 56.5 |
| Borotungstic | 36.8 | 71.7 |
| Silicotungstic | 32.0 | 62.4 |
| Phosphomolybdic | 32.0 | 62.4 |

The purified lactase portions obtained above have no undesirable flavor or odor when used to treat whey or milk. They also are useful throughout pH conditions from 2.5 to at least 7.0 with optimum activity at about pH 3.5. This enzyme activity at a relatively low pH of 3.5 is desirable in that low pH operating conditions generally eliminate bacterial contamination. This is important for food applications of lactase. It has an optimum activity temperature of about 60°–70° C. The above-prepared purified lactase is also stable at 60° C. in water solution without needing stabilizer additives. It also is not inhibited by the presence of metal ions, such as zinc, copper or silver, or by the presence of ethylenediaminetetraacetic acid. In contrast to this, the present commercially available lactase produced from *Saccharomyces fragilis* usually develops undesirable taste and smell when used to treat whey or milk, has a relatively high optimum activity pH of 6.8, has an optimum activity temperature of 35° C. and is unstable in water solution at 25° C. unless stabilized with additives. This prior art lactase is also inhibited by the presence of metal ions of zinc, copper and silver and by the presence of ethylenediaminetetraacetic acid.

Example 2

A lactase-containing aqueous solution was prepared from a fermentation of *Aspergillus awamori* NRRL 3112 in a manner similar to tthat described in Example 1. A portion of the lactase solution was then treated with phosphotungstic acid in the manner described in Example 1 to produce an isolated purified stable lactase.

The above examples employed *Aspergillus foetidus* ATCC 14916 or mutants thereof and *Aspergillus awamori* NRRL 3112 to prepare the lactase-containing starting material. It should be understood that the present invention can also be employed with lactase-containing materials obtained from other organisms, such as *Saccharomyces fragilis*. When the latter organism is employed, the lactase is formed within the yeast cells. These cells should be ruptured and the lactase-containing material should be removed from the cells prior to treatment with the heteropoly acid.

In summary, the present invention is directed at the use of certain heteropoly acids to form water-insoluble complexes with lactase so that the lactase can be separated from impurities.

What is claimed is:
1. A process for isolating and purifying a lactase which comprises mixing a lactase solution having a pH of about 2.5 to about 6.6 and containing impurities with a heteropoly acid selected from the class consisting of phosphotungstic acid, arsenotungstic acid, silicotungstic acid, borotungstic acid, phosphomolybdic acid, arsenomolybdic acid, silicomolybdic acid, boromolybdic acid, phosphovanadic acid, arsenovanadic acid, silicovanadic acid, borovanadic acid and mixtures and combinations thereof to form a precipitate between the lactase and the heteropoly acid, and then separating the resulting precipitate from the remaining impurity-containing solution.

2. A process according to claim 1 wherein the concentration of the heteropoly acid in the lactase solution is from about 0.1 to about 1 percent (weight/volume basis).

3. A process according to claim 1 wherein the concentration of the heteropoly acid in the lactase solution is about 0.5 percent (weight/volume basis) and the pH of the lactase solution is from about 3.0 to about 4.0.

4. A process according to claim 1 whereint he heteropoly acid is phosphotungstic acid.

5. A process according to claim 1 wherein the heteropoly acid is borotungstic acid.

6. A process according to claim 1 wherein the heteropoly acid is silicotungstic acid.

7. A process according to claim 1 wherein the heteropoly acid is phosphomolybdic acid.

8. A process according to claim 1 wherein the precipitate separated from the impurity-containing solution is dissolved by mixing with an aqueous solution having a pH between about 5 and about 9, the resulting solution is mixed with a substance selected from the class consisting of water-soluble calcium salts and water-soluble barium salts to form a precipitate with any heteropoly acid, and the resulting precipitate is separated from the remaining purified lactase solution.

9. A process according to claim 8 wherein the pH of the dissolving solution is from about 6 to about 8.5.

10. A stable purified lactase prepared by growing an organism selected from the class consisting of *Aspergillus foetidus* ATDC 14916, mutants thereof, and *Aspergillus awamori* NRRL 3112 in a suitable nutrient medium, filtering off the mycelium to form a filtrate, and isolating the lactase from the filtrate by the process of claim 1.

References Cited
UNITED STATES PATENTS 2,681,858  6/1954  Stimpson _____ 195—31
2,826,503  3/1958  Roberts _____ 195—66X LIONEL M. SHAPIRO, Primary Examiner U.S. Cl. X.R.

195—62